(12) United States Patent
Ayoub et al.

(10) Patent No.: US 11,934,565 B2
(45) Date of Patent: Mar. 19, 2024

(54) ANTI-CLONING SYSTEM FOR INTERNET OF THINGS DEVICES (71) Applicant: Thirdwayv, Inc., Irvine, CA (US)

(72) Inventors: Michael Atef Ayoub, Irvine, CA (US); Nabil Wasily, Foothill Ranch, CA (US)

(73) Assignee: THIRDWAYV, INC., Irvine, CA (US)

( * ) Notice: Subject to any disclaimer, the term of this patent is extended or adjusted under 35 U.S.C. 154(b) by 304 days.

(21) Appl. No.: 16/928,841

(22) Filed: Jul. 14, 2020

(65) Prior Publication Data
US 2021/0019447 A1 Jan. 21, 2021

Related U.S. Application Data (60) Provisional application No. 62/876,254, filed on Jul. 19, 2019.

(51) Int. Cl.
*G06F 21/73* (2013.01)
*G06F 21/44* (2013.01)
*G06F 21/60* (2013.01)
*G06F 21/64* (2013.01)
*H04W 4/80* (2018.01)

(52) U.S. Cl.
CPC .............. *G06F 21/73* (2013.01); *G06F 21/44* (2013.01); *G06F 21/602* (2013.01); *G06F 21/64* (2013.01); *H04W 4/80* (2018.02)

(58) Field of Classification Search
CPC ........ G06F 21/73; G06F 21/44; G06F 21/602; G06F 21/64; H04W 4/80
See application file for complete search history.

(56) References Cited

U.S. PATENT DOCUMENTS 9,256,881 B2  2/2016  Engels et al.
9,770,915 B1 * 9/2017  Ness ................... H04N 1/4413
10,461,941 B2 * 10/2019  Brockhaus ............ H04L 9/3263
(Continued)

FOREIGN PATENT DOCUMENTS

EP   3236376   10/2017
EP   3154287    6/2019

OTHER PUBLICATIONS

Multiple Printer Cartridge Systems, Feb. 9, 2015, Inkjet411 (Year: 2015).*

(Continued)

*Primary Examiner* — Lynn D Feild
*Assistant Examiner* — Ethan V Vo
(74) *Attorney, Agent, or Firm* — SNELL & WILMER LLP (57) ABSTRACT Methods, systems, devices and apparatuses for preventing use of fraudulent and/or counterfeit embedded devices. The anti-cloning system includes a first device configured to be coupled to or receive a first embedded device. The first embedded device has a first unique identity value. The anti-cloning system includes a controller. The controller is coupled to the first device. The controller has a controller memory. The controller memory is configured to store a public verification key. The controller has a controller processor. The controller processor is coupled to the controller memory and configured to verify the first unique identity value using the public verification key. The controller processor is configured to allow or permit the first device to operate and use the first embedded device when the first unique identity value is verified.

20 Claims, 7 Drawing Sheets

(56) References Cited

U.S. PATENT DOCUMENTS

| | | | | |
|---|---|---|---|---|
| 2009/0245176 | A1* | 10/2009 | Balasubramanian | ........................ H04W 48/20 370/328 |
| 2011/0154043 | A1* | 6/2011 | Lim | ........................ G06F 21/73 713/172 |
| 2014/0032907 | A1 | 1/2014 | Smith et al. | |
| 2014/0068738 | A1* | 3/2014 | Harty | ........................ G06F 21/44 726/7 |
| 2014/0196142 | A1* | 7/2014 | Louboutin | ............ H04L 63/101 726/16 |
| 2015/0082049 | A1* | 3/2015 | Rubinstein | ............ G06F 21/602 726/19 |
| 2015/0154484 | A1* | 6/2015 | Iwasaki | ................. G06F 3/1222 358/1.14 |
| 2015/0336005 | A1* | 11/2015 | Melnick | .................. A63F 13/73 463/29 |
| 2016/0173284 | A1* | 6/2016 | Jeran | .................. G03G 15/0863 713/180 |
| 2016/0187827 | A1* | 6/2016 | Jeran | ..................... G06F 21/608 399/12 |
| 2016/0285950 | A1* | 9/2016 | Lang | ........................ G07C 9/27 |
| 2018/0048643 | A1 | 2/2018 | Sharaga et al. | |
| 2020/0000143 | A1* | 1/2020 | Anderson | ............... G06F 18/22 |

OTHER PUBLICATIONS

International Search Report and Written Opinion (dated Oct. 26, 2020) for PCT/US2020/042013, filed Jul. 14, 2020).

* cited by examiner

ANTI-CLONING SYSTEM FOR INTERNET OF THINGS DEVICES

CROSS-REFERENCE TO RELATED APPLICATIONS

This application claims priority to and the benefit of U.S. Provisional Patent Application No. 62/876,254 titled "ANTI-CLONING SYSTEM FOR INTERNET OF THINGS DEVICES," filed on Jul. 19, 2019, and the entirety of which is hereby incorporated by reference herein.

BACKGROUND

1. Field

This specification relates to a system, apparatus and/or method for preventing, detecting and/or identifying fraudulent and/or counterfeit Internet-of Things (IoT) devices.

2. Description of the Related Art

The Internet-of-Things (IoT) is a system of interrelated computing devices, mechanical and digital machines provided with unique identifiers and have the ability to transfer and receive data over a network without requiring human-to-human or human-to-computer interaction. Embedded systems, wireless networks, control systems and other systems contribute to enabling IoT devices. The fraudulent imitation of IoT devices is a problem of IoT systems. The fraudulent imitation of IoT devices arises in both consumable as well as non-consumable IoT devices. There is both a financial impact and a security impact that results from the use of fraudulent and/or counterfeit devices and components within the IoT system. Thus, a vendor or other commercial supplier or distributor may want to technologically enforce the use of genuine components by an IoT device within an IoT system to prevent counterfeiting and/or other security vulnerabilities and to preserve their market.

Accordingly, there is a need for a system, an apparatus, a method and/or a device to verify the authenticity of consumable and non-consumable components within an IoT system to prevent the use of fraudulent and/or counterfeit components.

SUMMARY

In general, one aspect of the subject matter described in this specification is embodied in a device, a system and/or an apparatus for preventing use of fraudulent and/or counterfeit embedded devices. The anti-cloning system includes a first device configured to be coupled to or receive a first embedded device. The first embedded device has a first unique identity value. The anti-cloning system includes a controller. The controller is coupled to the first device. The controller has a controller memory. The controller memory is configured to store a public verification key. The controller has a controller processor. The controller processor is coupled to the controller memory and configured to verify the first unique identity value using the public verification key. The controller processor is configured to allow or permit the first device to operate and use the first embedded device when the first unique identity value is verified.

These and other embodiments may optionally include one or more of the following features. The controller may be included within the first device. The unique identity value may be a media access control (MAC) address, a Bluetooth Low Energy (BLE) address or a serial number of the first device. The controller may be a second device that is remote from the first device. The first device may be configured to be coupled to or receive the first embedded device. The controller processor may be configured to determine whether the first unique identity value is in a consumed devices list that lists unique identity values of embedded devices that have been consumed. The controller processor may be configured to prevent operation or use of the first embedded device when the first unique identity value is on the consumed devices list.

The anti-cloning system may include a server. The server may be configured to store a consumed devices list. The server may be configured to check the first unique identity value against the consumed devices list. The controller processor may be configured to provide the first unique identity value to the server for verification and may be configured to obtain an indication that the first unique identity value is or is not verified.

The controller memory may be configured to store an operating list of embedded devices that can be used without being compared to a consumed devices list. The controller processor may be configured to send an alert when any of the embedded devices on the operating list match an embedded device on the consumed devices list. The controller processor is configured to prevent or stop use of any embedded device on the operating list that matches an embedded device on the consumed devices list.

The controller processor may be configured to determine that there is no connection between the controller and the server. The controller processor may be configured to determine a duration of time since the operating list was checked against the consumed devices list. The controller processor may be configured to prevent use of the first embedded device when the duration of time exceeds a threshold amount. The controller processor may be configured to allow use of the first embedded device when the duration of time is less than the threshold amount of time.

The anti-cloning system may include a server. The server may be configured to obtain the first unique identity value. The server may be configured to compare the first unique identity value to a consumed devices list. The server may be configured to indicate to the controller that the first embedded device is fraudulent when the first unique identity value is on the consumed devices list. The server may be configured to indicate to the controller that the first embedded device is verified when the first unique identity value is not on the consumed devices list. The server may be configured to add the first unique identity value to the consumed devices list when the first unique identity value is not on the consumed devices list.

The anti-cloning system may include a second device. The second device may be configured to be coupled to or receive a second embedded device having a second unique identity value. The controller processor may be configured to verify the second unique identity value using the public verification key. The first device may be configured to be coupled to or receive a second embedded device. The second embedded device may have a second unique identity value. The controller processor may be configured to verify the second unique identity value using the public verification key.

In another aspect, the subject matter is embodied in an anti-cloning system. The anti-cloning system may include a server. The server is configured to verify unique identity values. The anti-cloning system includes a device. The device is configured to be coupled to or receive an embedded device having a unique identity value. The anti-cloning system includes a controller. The controller is coupled to the device. The controller has a controller memory. The controller memory is configured to store a public verification key. The controller has a controller processor. The controller processor is coupled to the controller memory and configured to verify the unique identity value using the public verification key. The controller processor is configured to allow or permit the device to operate and use the embedded device when the unique identity value is verified.

In another aspect, the subject matter is embodied in a method of verifying an embedded device. The method includes determining, by a processor of a controller, that the embedded device has been inserted into a device. The embedded device has a unique identity value. The method includes verifying, by the processor of the controller, a digital signature on the unique identity value of the embedded device. The method includes determining, by the processor of the controller, whether the embedded device is on a consumed devices list or on an operating list based on a connection between the controller or the device with a server. The method includes preventing, by the processor of the controller, use of the embedded device by the device when the embedded device is on the consumed devices list. The method includes allowing or permitting, by the processor of the controller, the device to operate and use the embedded device when the unique identity value is verified and not on the consumed devices list.

BRIEF DESCRIPTION OF THE DRAWINGS

Other systems, methods, features, and advantages of the present invention will be or will become apparent to one of ordinary skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale and may be exaggerated to better illustrate the important features of the present invention. In the drawings, like reference numerals designate like parts throughout the different views.

DETAILED DESCRIPTION

Disclosed herein are systems, apparatuses, devices and methods for an anti-cloning system. The anti-cloning system verifies and authenticates the authenticity of an embedded device that is connected or coupled to a device. The embedded device may be a consumable device that is consumed by the electronic device or a non-consumable device. For example, an IoT device may be a printer where the vendor may want to enforce the use of genuine cartridges and/or a vaporizer (or "vape device") where the vendor may want to enforce the use of genuine vaping pods. In another example, an IoT device may be an electronic cigarette or other IoT device that connects to an embedded device, such as a cigarette cartridge.

The anti-cloning system verifies the authenticity of the embedded device when the embedded device is coupled to or connected to the IoT device. This ensures that the embedded device is not fraudulent and not a counterfeit, which prevents financial loss to the vendor, manufacturer and/or distributor while also ensuring that the security of the IoT system is not compromised by a fraudulent embedded device.

Other benefits and advantages include the use of unique identity values from fraudulent imitations without the need for a certificate on every IoT device. Often, a fraudulent vendor gains access to correct identities of a genuine product and copies such identities to produce a counterfeit embedded device. These identities may be an alphanumerical value, a Media-Access-Control (MAC) address or other such identity. And as such, the fraudulent vendor is able to reproduce counterfeit embedded devices. One solution that may be employed by an IoT system includes the use of unique certificates that are linked to a secret key to ensure that the embedded device is not fraudulent and not a counterfeit. This, however, requires additional hardware and/or software, which results in a cost prohibitive implementation. The anti-cloning system, however, uses various lists, such as a consumed devices list, to verify the authenticity of an embedded device that is or being connected to the device. The use of these lists, policies and processes limits the need for certificates, which minimizes the costs associated with the implementation.

Additionally, the anti-cloning system has multiple modes for when the controller is connected or only intermittently connected with a server to verify the validity of the embedded device. The use of the multiple modes allows for continued operation and validation of the embedded device even when the controller is not connected to the server.

Figure 1A:
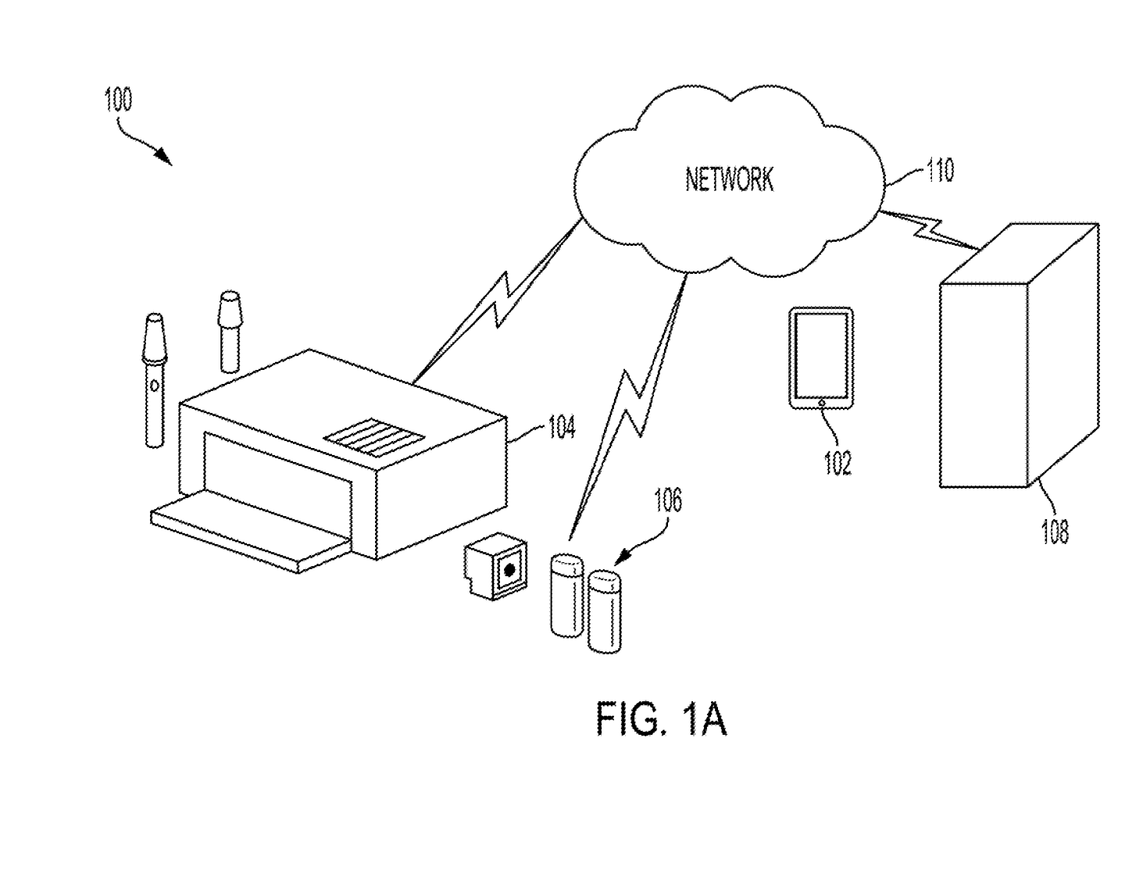
FIG. 1A is a diagram of an example anti-cloning system according to an aspect of the invention.

FIG. 1A shows a diagram of the anti-cloning system 100. The anti-cloning system 100 includes a control device, such as a controller 102 and/or an electronic device 104. The control device facilitates the use and validation of an embedded device 106. The controller 102 may be a smartphone, a tablet, a personal computer or other personal device, for example, and may have an application that controls use of a single embedded device by a single electronic device or by multiple electronic device and/or use of multiple embedded devices to a single electronic device or by multiple electronic devices. The controller 102 controls access to and use of the electronic device 104 and may interact and provide a gateway between a server 108 and the electronic device 104. This prevents the electronic device 104 from using the embedded device 106 without validation and verification that the embedded device 106 is authentic, e.g., not counterfeit or fraudulent.

The electronic device 104 may couple, consume or otherwise use the embedded device 106. For example, the electronic device 104 may be a printer, an electronic cigarette, a vaporizer or other device that consumes or uses an embedded device 106. The electronic device 104 may include the controller 102 and/or may perform some or all the functions of the controller 102. That is, the electronic device 104 may include the controller 102 and/or the electronic device 104 may be separate from and be coupled to the controller 102. In some implementations, when the controller 102 is separate from the electronic device 104, the electronic device 104 may act as an intermediate controller that performs some of or all of the functions of the controller 102 and works in conjunction with the controller 102 to validate and/or verify that the embedded device 106 is authentic. The electronic device 104 may consume or use a single embedded device or use multiple embedded devices, such as a first embedded device and a second embedded device, simultaneously or concurrently.

The anti-cloning system 100 may include an embedded device 106, such as a printer cartridge, an electronic cigarette cartridge, a vape pod, or other consumable or non-consumable item and/or a server 108. The embedded device 106 may be an electrical embedded device or a non-electrical embedded device. The embedded device 106 may be inserted into, received within or otherwise coupled to the electronic device 104 so that the electronic device 104 may consume or use the embedded device 106. Each embedded device 106 may have a unique identity value that uniquely identifies the embedded device 106. The unique identity value may be an electronic identifier or a non-electronic identifier. For example, the unique identity value may be a media access control (MAC) address, a Bluetooth Low Energy (BLE) address or a serial number of the embedded device 106.

The controller 102 and/or the electronic device 104 may verify, validate and/or authenticate the embedded device 106 prior to consumption or use of the embedded device 106 so that a counterfeit or fraudulent embedded device is not inserted, used or coupled to the electronic device 104, which prevents a security threat to the electronic device 104.

The anti-cloning system 100 may include a server 108 or other remote device. The server 108 may validate the digital signature or perform other forms of validation, verification or authentication of the embedded device 106 to ensure that the embedded device 106 is a valid embedded device that may be consumed or used. Moreover, the server 108 may maintain a database. A database is any collection of pieces of information that is organized for search and retrieval, such as by a computer, and the database may be organized in tables, schemas, queries, report, or any other data structures. A database may use any number of database management systems. An external database 130 may include a third-party server or website that stores or provides information. The information may include real-time information, periodically updated information, or user-inputted information. A server may be a computer in a network that is used to provide services, such as accessing files or sharing peripherals, to other computers in the network. A website may be a collection of one or more resources associated with a domain name.

The database may include a consumed devices list, a black list and/or a cloned devices list. The database may be used to determine embedded devices that are fraudulent, have been previously used, or otherwise determined to be unfit for use, such as a counterfeit, cloned or fraudulent embedded device.

The anti-cloning system 100 may include a network 110. The various components of the anti-cloning system 100 may be coupled to or integrated with one another by the network 110. The network 110 may be a local area network (LAN), a wide area network (WAN), a cellular network, a digital short-range communication (DSRC), the Internet, or a combination thereof, which connects the server 108, the embedded device 106 and/or the electronic device 104.

Figure 1B:
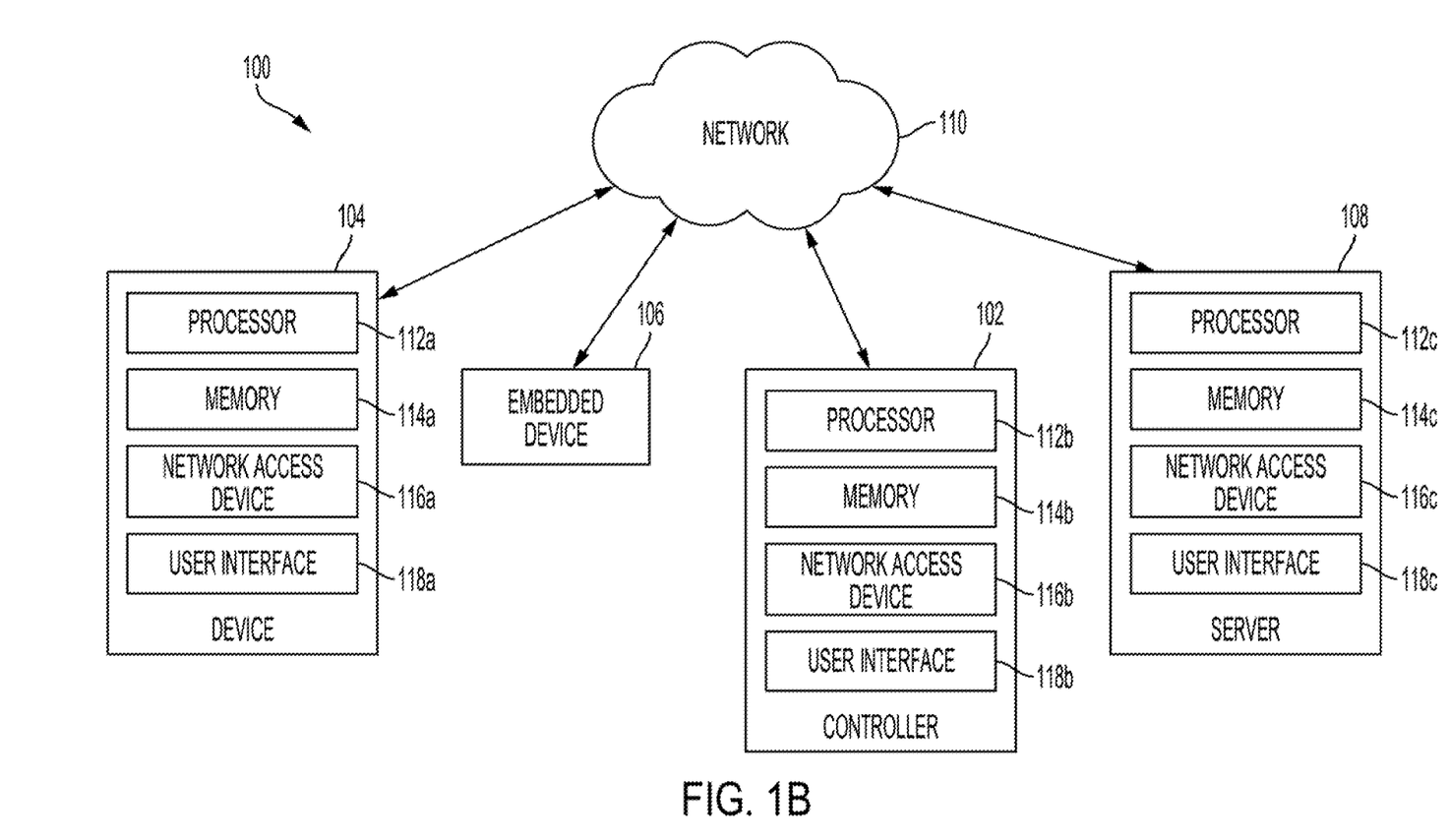
FIG. 1B is a block diagram of the anti-cloning system of FIG. 1 according to an aspect of the invention.

FIG. 1B shows a block diagram of the anti-cloning system 100. The anti-cloning system 100 includes one or more processors 112*a-c*. For example, the electronic device 104 may include a processor 112*a*, the controller 102 may include a processor 112*b* and the server 108 may include a processor 112*c*. Each of the one or more processors 112*a-c* within their corresponding component may be implemented as a single processor or as multiple processors. The one or more processors 112*a-c* may be electrically coupled to some or all of the components of the anti-cloning system 100. The one or more processors 112*a-c* may be coupled to one or more memories 114*a-c* and/or one or more network access devices 116*a-c*, for example. The one or more processors 112*a-c* may be used to verify and validate the embedded device 106 and perform other functions, such as alerting the user of a counterfeit, fraudulent or otherwise invalid embedded device.

The anti-cloning system 100 includes one or more memories 114*a-c*. The one or more memories 114*a-c* may store instructions to execute on their respective processors 112*a-c*. For example, the memory 114*a* may be coupled to the processor 112*a*, the memory 114*b* may be coupled to the processor 112*b*, and the memory 114*c* may be coupled to the processor 112*c*. The one or more memories 114*a-c* may include one or more of a Random Access Memory (RAM) or other volatile or non-volatile memory. The one or more memories 114*a-c* may be a non-transitory memory or a data storage device, such as a hard disk drive, a solid-state disk drive, a hybrid disk drive, or other appropriate data storage, and may further store machine-readable instructions, which may be loaded and executed by the one or more processors 112*a-c*. The one or more memories 114*a-c* may store a consumed devices list, a cloned devices list, an operating list, a black list or other list that verifies or validates an embedded device 106. In some implementations, the various lists or a subset of the list may be stored within the one or more memories 114*a-c*. The anti-cloning system 100 may use the lists to validate, verify and/or authenticate the embedded device 106.

The anti-cloning system 100 may include one or more network access devices 116*a-c*. The one or more network access devices 116*a-c* may be used to couple the various components of the anti-cloning system 100 via the network 110. For example, the electronic device 104 may include a network access device 116*a*, the controller 102 may include a network access device 116*b* and the server 108 may include a network access device 116*c*. The one or more network access devices 116*a-c* may include a communication port or channel, such as one or more of a Wi-Fi unit, a Bluetooth® unit, a Radio Frequency Identification (RFID) tag or reader, a DSRC unit, or a cellular network unit for accessing a cellular network (such as 3G, 4G or 5G). The one or more network access devices 116*a-c* may transmit data to and receive data from the various components.

The anti-cloning system 100 may include one or more user interfaces 118*a-c* that provide a user interface to the user and/or other operator to interact with the anti-cloning system 100. For example, the electronic device 104 may include a user interface 118*a*, the controller 102 may include a user interface 118b and the server 108 may include a user interface 118c. The one or more user interfaces 118a-c may include an input device that receives user input from a user interface element, a button, a dial, a microphone, a keyboard, or a touch screen. The one or more user interfaces 118a-c may provide an interface for a user to provide user input. The user input may include one or more configuration settings. The one or more configuration settings may include the number of embedded devices that are allowed to be added to the operating list, for example.

Figure 2:
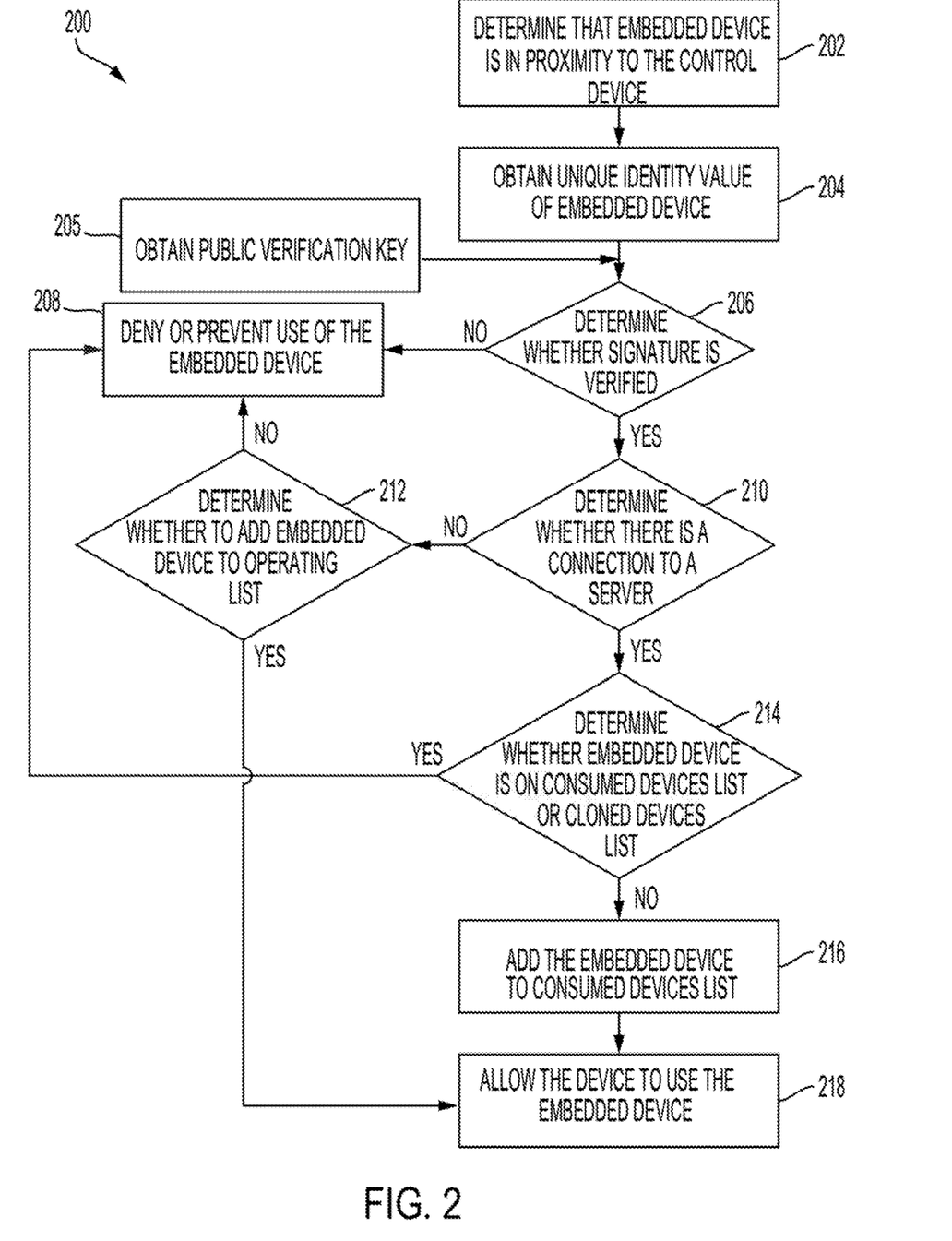
FIG. 2 is a flow diagram of an example process for determining whether an embedded device is authentic using the anti-cloning system of FIGS. 1A and 1B according to an aspect of the invention.

FIG. 2 is a flow diagram of an example process 200 for determining whether an embedded device 106 is authentic and may be consumed or used. One or more computers or one or more data processing apparatuses, for example, the one or more processors 112a-c of the anti-cloning system 100 of FIGS. 1A and 1B, appropriately programmed, may implement the process 200. For example, the processor 112b of the controller 102 may interact with the processor 112c of the server 108 to verify the use of the embedded device 106 by the electronic device 104. In another example, the processor 112a of the electronic device 104 or the processor 112b of the controller 102 may verify the use of the embedded device 106 using the consumed devices list, the cloned devices list and/or the operating list that may be stored locally or remotely on the electronic device 104 and/or the controller 102.

In some implementations, the electronic device 104 performs the functions of the controller 102 or acts as an intermediate controller, which performs some of or all of the functions of the controller 102 or in conjunction with the controller 102. As discussed above, the controller 102 and/or the electronic device 104, which may function as an intermediate controller, and/or may be referred to as a control device of the anti-cloning system 100.

The control device may determine that the embedded device 106 is in proximity to the control device (202). The control device may send keep-alive messages to the embedded device 106 to check whether the embedded device 106 is within a threshold distance of the control device. If the keep-alive messages are not received or are not responded to, the control device may determine that the embedded device 106 is not in proximity to the control device and cease operation after a period of time, such as approximately a few hours. This ensures that the control device is in proximity to the embedded device 106, which prevents use of the embedded device by a different user without the original user or owner present. Otherwise, if the keep-alive messages are received and/or are responded to, the control device may continue normal operation of the embedded device 106. The keep-alive message may be digitally signed and require verification by, for example, a public key certificate stored on the control device, such as the electronic device 104 and/or the controller 102.

Once the embedded device 106 is determined to be in proximity to the control device, the control device obtains the unique identity value of the embedded device 106 (204). The control device may scan, read or otherwise obtain input that include the unique identity value. The unique identity value may be a media access control (MAC) address, a Bluetooth Low Energy (BLE) address or a serial number on the embedded device 106. The unique identity value may have been digitally signed, by the server 108, using a secret signing key, such as a private key, during the manufacturing, provisioning and/or distribution. For example, the control device may use a scanner, a camera or a bar code reader to scan or capture the serial number on the embedded device 106.

The control device may obtain a public verification key to validate the signature on the unique identity value (205). The control device may obtain the public verification key from the server 108. The control device may provide a token to the server 108, which may validate the token and provide the public verification key to the control device. In some implementations, the server sends a token to the control device, such as through a short message service (SMS) or push notification, and the control device provides a token value back to the server 108 prior to providing the public verification key to the control device.

The control device may determine whether the signature on the unique identity value is valid (206). The control device may use a public verification key or certificate that is stored in the memory of the control device to validate or verify the digital signature on the unique identity value of the embedded device 106. For example, the electronic device 104 may verify the digital signature on the unique identity value of the embedded device 106 and/or the controller 102 may verify the digital signature on the unique identity value of the embedded device 106. The control device may have obtained the public verification key or certificate from the server 108 and use the public verification key or certificate to verify and validate the digital signature.

If the control device determines that the unique identity value is not valid, the control device denies or prevents use of the embedded device 106 by the electronic device 104 (208). The control device may prevent the embedded device 106 from communicating with the electronic device 104 and/or may disconnect the communication channel between the electronic device 104 and the embedded device 106. Otherwise, if the control device determines that the unique identity is valid, the control device determines whether there is a connection to the server 108 to conduct further checks (210).

When the control device determines that the unique identity value is valid, the control device may determine whether there is a connection to a server 108. The control device may use the one or more network access devices 116a-c to communicate among and/or establish communication among the electronic device 104, the controller 102 and the server 108. The communication channel may be a secure communication channel over the network 110.

Figure 3:
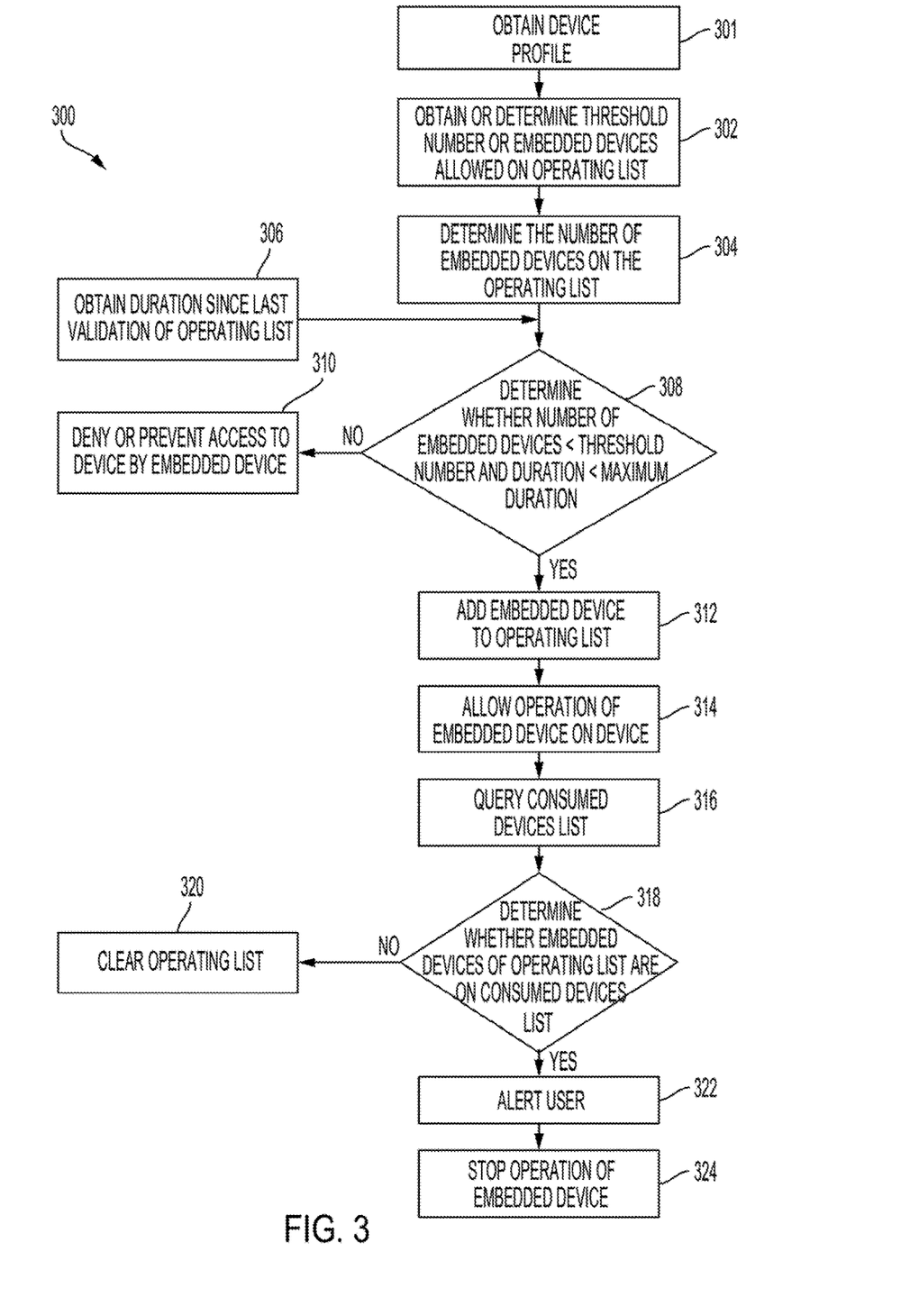
FIG. 3 is a flow diagram of an example process for determining whether an embedded device is placed on the operating list using the anti-cloning system of FIGS. 1A and 1B according to an aspect of the invention.

If the control device attempts to connect with the server 108 and does not or is unable to establish a connection with the server 108, the control device may determine that there is only intermittent access to the server 108. And as such, the control device may determine whether to add the embedded device 106 to the operating list (212). The operating list may be stored on the electronic device 104 and/or the controller 102. The operating list indicates the one or more embedded devices 106 that may be operated by the electronic device 104 when the control device is unable to establish a connection with the server 108 to check the embedded device 106 against various lists. When the control device determines to add the embedded device 106 to the operating list, the control device allows the electronic device 104 to couple with, use and consume the embedded device 106 (218). The allowed usage or operation may be temporary and only for a certain period of time. Otherwise, when the control device determines not to add the embedded device 106 to the operating list, the control device denies or prevents the electronic device 104 from using the embedded device 016 (208). FIG. 3 further describes the process 300 for adding the embedded device 106 to the operating list.

Figure 4:
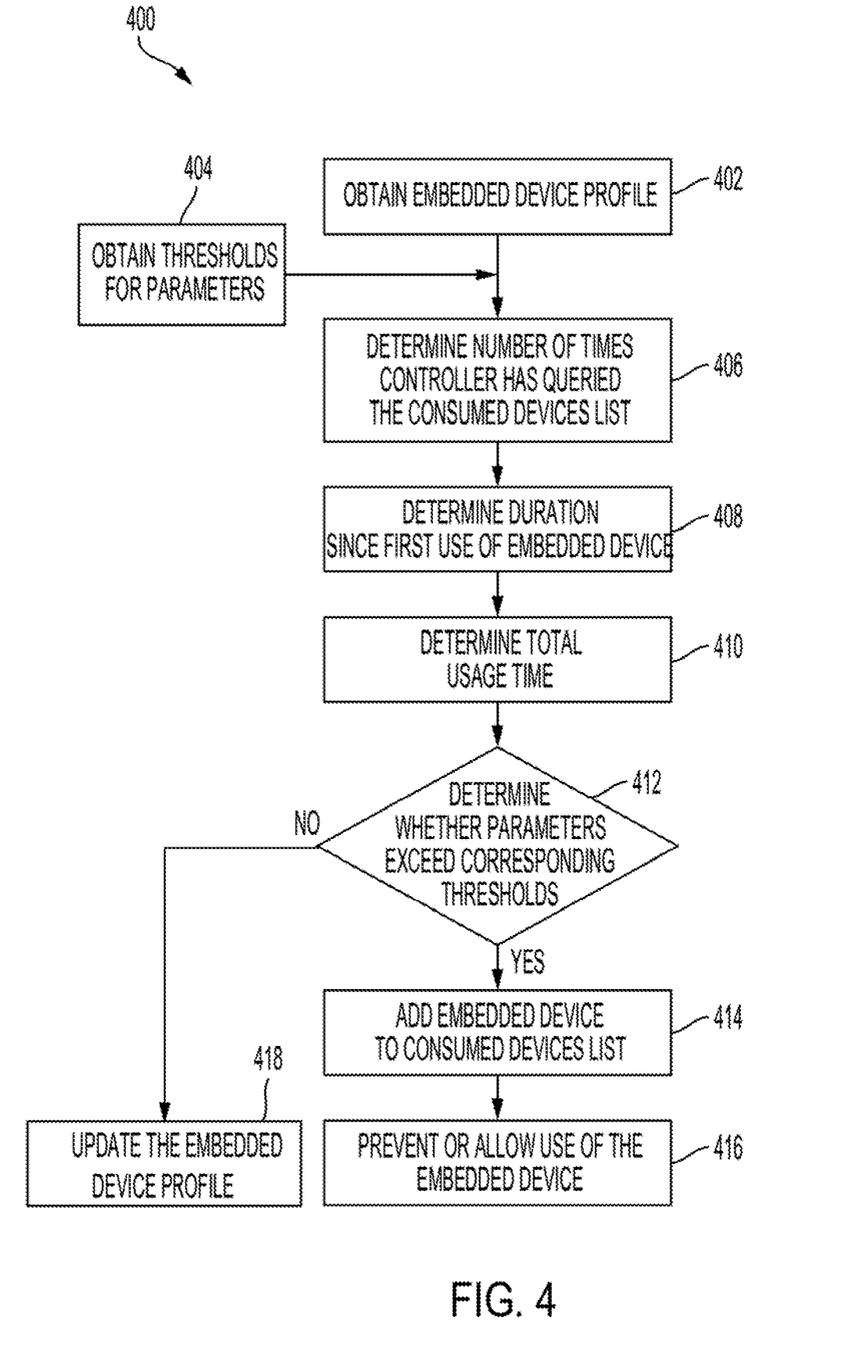
FIG. 4 is a flow diagram of an example process for determining whether an embedded device is added to the consumed devices list using the anti-cloning system of FIGS. 1A and 1B according to an aspect of the invention.

Otherwise, if the control device determines that there is a connection to the server 108, the control device may determine whether the embedded device 106 is on a consumed devices list and/or a cloned devices list (214). The consumed devices list may indicate unique identity values or other identifiers of one or more embedded devices 106, which have been consumed or used. This prevents the re-use of the unique identity values or other identifiers by counterfeiters. The control device may provide the unique identity value to the server 108. The server 108 may compare the unique identity value to the unique identity values listed on the consumed devices list and provide an indication to the control device as to whether the unique identity value matches a unique identity value on the consumed devices list. In some implementations, the control device may maintain the consumed devices list or a subset of the consumed devices list within the one or more memories of the control device so that the control device may perform the comparison of the unique identity value to the unique identity values on the consumed devices list without the need of a connection with the server 108. The consumed devices list on the control device may be updated periodically with a master consumed devices list on the server 108. FIG. 4 further describes the process of maintaining the consumed devices list.

Similarly, the control device may perform a comparison of the unique identity value with the unique identity values on a cloned devices list. The cloned devices list includes unique identity values or identifiers of embedded devices known to have been cloned or have otherwise been known or identified as fraudulent and/or counterfeit. For example, when the number of queries for an embedded device is greater than a threshold amount, the unique identity value of the embedded device 106 may be added to a cloned devices list, which may be maintained by the server 108. The consumed devices list and/or the cloned devices list may be prioritized such that when a subset is provided to be stored and used locally, the unique identity values of the highest priority or most likely fraudulent and/or counterfeit embedded devices are included within the subset.

When the control device determines that the embedded device 106 is not on the consumed devices list and not on the cloned devices list, the control device may add the unique identity value of the embedded device 106 to the consumed devices list (216). FIG. 4 further describes the process of adding the embedded device 106 to the consumed devices list. Then, the control device may allow the electronic device 104 to use the embedded device 106 (218). Otherwise, when the control device determines that the embedded device 106 is on the consumed devices list or on the cloned devices list, the control device may prevent the electronic device 104 from using the embedded device 106, as described above (208).

FIG. 3 is a flow diagram of an example process 300 for determining whether an embedded device 106 is on an operating list when the control device is not connected to the server 108. One or more computers or one or more data processing apparatuses, for example, the one or more processors 112a-c of the anti-cloning system 100 of FIGS. 1A and 1B, appropriately programmed, may implement the process 300. For example, the processor 112b of the controller 102 or the processor 112a of the electronic device 104 may use the operating list to temporarily grant access privileges to the embedded device 106.

When there is an intermittent connection with the server 108 and/or the control device is unable to connect with the server 108, the control device may allow for a number of embedded devices to operate temporarily or for a set duration of time without validation or verification of the operating list against the consumed device list. In order to operate an embedded device 106, the control device may use an operating list to track the embedded device 106. The control device may obtain a profile associated with the electronic device 104 (301). The profile may indicate the number of embedded devices on the operating list, the threshold number of embedded devices allowed on the operating list, a timestamp that indicates when the operating list was last updated and/or compared with the consumed devices list and/or a maximum duration allowed since the last validation. The profile may be used to determine whether to add an embedded device 106 to the operating list.

The control device obtains or determines the threshold number of embedded devices that are to be allowed on the operating list (302). The threshold number may be static or dynamic. For example, the threshold number may be pre-configured and/or have a default configuration that limits the number of embedded devices on the operating list, such as to a maximum of 5 embedded devices on the operating list. In another example, the threshold number may be adjusted in real-time based on user input or based on other parameters, such as the duration of time since the operating list was checked against the consumed devices list.

The control device may obtain user input, such as via the one or more user interfaces 118a-b, that indicates the threshold number of embedded devices to be allowed on the operating list and/or may have an initial default number that decrements as the duration since the operating list has been checked against the consumed devices list increases. For example, the operating list may initially allow for 5 embedded devices to be on the operating list, but if the operating list is not checked against the consumed devices list for over a month, the control device may reduce the number of allowed embedded devices to 4.

Once the control device determines the threshold number of embedded devices allowed on the operating list, the control device determines the number of embedded devices that are on the operating list (304). The control device may maintain a profile that stores an indication of the current number of embedded devices on the operating list that are used or being used by the electronic device 104. In some implementations, the control device may maintain multiple operating lists. Each operating list may be associated with a corresponding electronic device 104, and the control device obtains the profile of the electronic device 104 to check the indication of the current number of embedded devices on the operating list associated with the electronic device 104. The indication may be a counter or other variable that tracks the number of embedded devices on the operating list.

The control device may determine the duration of time since the last validation of the operating list against the consumed devices list (306). The control device may obtain the timestamp that indicates when the operating list was last updated and/or compared with the consumed devices list from the profile associated with the electronic device 104 and compare the time stamp to a current timestamp. The current timestamp may be obtained from a clock, a global positioning system or other device on the electronic device 104, the controller 102 and/or the server 108. The control device may calculate the difference in time between the current timestamp and the obtained timestamp to determine the duration of time since the last validation of the operating list.

The control device determines whether the number of embedded devices is less than the threshold number allowed on the operating list and the duration of time since the last validation is less than a maximum duration (308). The control device may determine the maximum duration using the profile associated with the electronic device 104. The control device compares the number of embedded devices to that of the threshold number and the duration of time to the maximum duration. When either the number of embedded devices is greater than or equal to the threshold number or the duration of time is greater than the maximum duration, this may indicate that the operating list is full or that the operating list needs to be validated prior to any other embedded device being added to the operating list. Thus, the control device may deny or prevent the embedded device 106 from being coupled or used by the electronic device 104 (310).

Otherwise, when the control device determines that the number of embedded devices is less than the threshold number and the duration of time is less than the maximum duration, this may indicate that there is availability on the operating list to add the embedded device 106 and that the operating list has been recently compared to the consumed devices list. And thus, the control device adds the embedded device to the operating list (312). Once the control device adds the embedded device 106 to the operating list, the control device allows the electronic device 104 to use, consume or otherwise operate using the embedded device 106, as described above (314). For example, a printer may be allowed to use a printer cartridge to print pages, an electronic cigarette may be allowed to use a electronic cartridge, and/or a vaporizer may be allowed to use a vape pod.

While the control device allows the electronic device 104 to operate or use the embedded device 106 temporarily when on the operating list, the control device continues to query the server 108 to access the consumed device list (316). The control device sends one or more messages to the server 108 to monitor the status of the connection to the server 108 when there is an intermittent connection. The query may include the operating list, which identifies one or more unique identity values of one or more embedded devices that are temporarily operational by the electronic device 104. The server 108 may check the operating list against the consumed device list to validate and/or verify any embedded devices on the operating list.

The control device determines whether the embedded devices on the operation list are on the consumed devices list (318). The control device compares each of the one or more embedded devices and/or one or more unique identity values of the one or more embedded devices to the embedded devices and/or corresponding unique identity values of the embedded devices. The control device determines whether there is a match between any of the embedded devices on the operating list and any of the embedded devices on the consumed devices list. When there is no match between the operating list and the consumed devices list, the control device clears the operating list and allows the electronic device 104 to consume or use the embedded devices (320).

Otherwise, when the control device determines that there is a match between the operating list and the consumed devices list, the control device alerts the user (322). The control device may send an alert to the user via one or more user interfaces 118*a-c*. The alert may indicate to the user that one of the embedded devices on the operating list is a counterfeit, consumed, fraudulent or otherwise invalid and/or unverified. The alert may include the unique identity value of the embedded device 106 that has been found to be matched so that the user can identify the counterfeit and/or fraudulent embedded device. After the alert is sent to the user, the control device may stop, prevent or otherwise deny operation of the embedded device 106 by the electronic device 104, as described above (324).

FIG. 4 is a flow diagram of an example process 400 for determining whether an embedded device 106 should be added to the consumed devices list. One or more computers or one or more data processing apparatuses, for example, the one or more processors 112*a-c* of the anti-cloning system 100 of FIGS. 1A and 1B, such as the processor 112*c* of the server 108 appropriately programmed, may implement the process 400.

Once the anti-cloning system 100 determines that the embedded device 106 is being coupled to the electronic device 104 and/or being inserted into the electronic device 104 does not match any of the embedded devices on the consumed devices list, the control device may determine whether to add the embedded device 106 to the consumed devices list, and subsequently, allow access and use of the embedded device 106 by the electronic device 104. The server 108 may track the use of the embedded device 106 using the consumed devices list to provide an indication to the control device as to whether to add the embedded device 106 to the consumed devices list and allow the electronic device 104 to use the embedded device 106.

The anti-cloning system 100 may obtain an embedded device profile (402). The processor 112*c* of the server 108 may obtain the embedded device profile from the memory 114*c*. The embedded device profile may store information regarding a corresponding embedded device 106. The stored information may include one or more parameters. The one or more parameters may include an indicator of a timestamp of when the corresponding embedded device was first queried to the server 108 to check if the embedded device 106 is on the consumed device list. The one or more parameters may include the number of times that the embedded device 106 has been queried to be checked against the consumed device list. The one or more parameters may include other information, such as the total duration of the usage time of the embedded device 106. The usage time may be a duration of time that increments while the embedded device 106 is in use by the electronic device 104. The server 108 may use the embedded device profile to determine when the embedded device 106 is consumed and should be added to the consumed device list. Each embedded device profile may correspond to a different embedded device.

The anti-cloning system 100 may obtain one or more thresholds that correspond to the one or more parameters (404). The one or more thresholds may be a maximum number of times that the embedded device 106 may be queried against the consumed devices list, a maximum total duration of usage time and/or an expiration time or a maximum elapsed time since the first use of the embedded device 106. The one or more thresholds may be a default value that is pre-configured or set during manufacturing, provisioning and/or distribution and/or the one or more thresholds may be a user-configured value, which is received via user input through the one or more user interfaces 118*a-c*. The threshold that corresponds to the maximum number of times that the embedded device 106 may be used limits the electronic device 104 from using the same embedded device 106 more than a threshold amount so as to prevent another user or operator from cloning the unique identity value and using the unique identity value for multiple counterfeit or fraudulent embedded devices. The maximum total duration of usage time and/or the expiration time or the maximum elapsed time limits the embedded device 106 from being used more than a set amount of time so that an outdated or used embedded device is not re-used so as to prevent the use of expired unique identity values.

The anti-cloning system 100 may determine the number of times the controller 102 has queried the consumed devices list (406). The server 108 extracts the indicator from the embedded device profile to determine the number of times that the embedded device 106 has been queried against the consumed devices list, which counts the number of times that the embedded device 106 has already had its unique identity value checked against the consumed devices list.

The anti-cloning system 100 may determine the duration time since the first use of the embedded device 106 (408). The anti-cloning system 100 may compare the indicator of the timestamp of when the corresponding embedded device was first queried to the server 108 with a current timestamp. The indicator may be obtained from the embedded device profile. The anti-cloning system 100 may determine the difference between the current timestamp to the indicator of the timestamp of when the embedded device was first queried and use the difference between the two timestamps as the duration time since the first use.

The anti-cloning system 100 may determine the total duration of the usage time of the embedded device 106 (410). The anti-cloning system 100 may increment the usage time as the embedded device 106 is being used by the electronic device 104 and store the usage time in the embedded device profile. The anti-cloning system 100 may extract the total duration of the usage time to determine whether to add the embedded device 106 to the consumed devices list.

The anti-cloning system 100 determines whether the one or more parameters exceed their corresponding threshold (412). The anti-cloning system 100 compares the number of times the embedded device 106 has been used to the maximum number of times that the embedded device 106 may be used, the duration time since the first use to the expiration time or the maximum elapsed time since the first use of the embedded device 106 and/or the total duration of the usage time to the maximum total duration of the usage time. If one of the one or more parameters exceeds their corresponding threshold, such as when the one or more parameters is greater than their corresponding threshold, the anti-cloning system 100 may determine that the embedded device 106 is consumed and add the embedded device 106 and/or the unique identity value of the embedded device 106 to the consumed devices list (414). When the embedded devices 106 is added to the consumed devices list, this indicates that the embedded device 106 has been used more than the anticipated amount that the embedded device 106 was expected to be used. The anti-cloning system 100 prevents use or allows use of the embedded device 106 in this final instance (416). In some implementations, the anti-cloning system 100 allows a final use of the embedded device 106, and subsequently, prevents future use of the embedded device 106. In some implementations, the anti-cloning system 100 prevents the use of the embedded device 106.

Otherwise, if the one or more parameters do not exceed their corresponding threshold, this may indicate that the embedded device 106 may be re-used or continued to be used by the electronic device 104. The anti-cloning system 100 updates the embedded device profile with the one or more parameters and allows use of the embedded device 106 (418). The anti-cloning system may increment the number of times that the controller has operated the embedded device 106, update the total usage time and/or update the duration since the first use of the embedded device 106, and store the updated one or more parameters within the embedded device profile to be stored in the memory 114c. Then, the anti-cloning system 100 may allow use of the embedded device 106.

Figure 5:
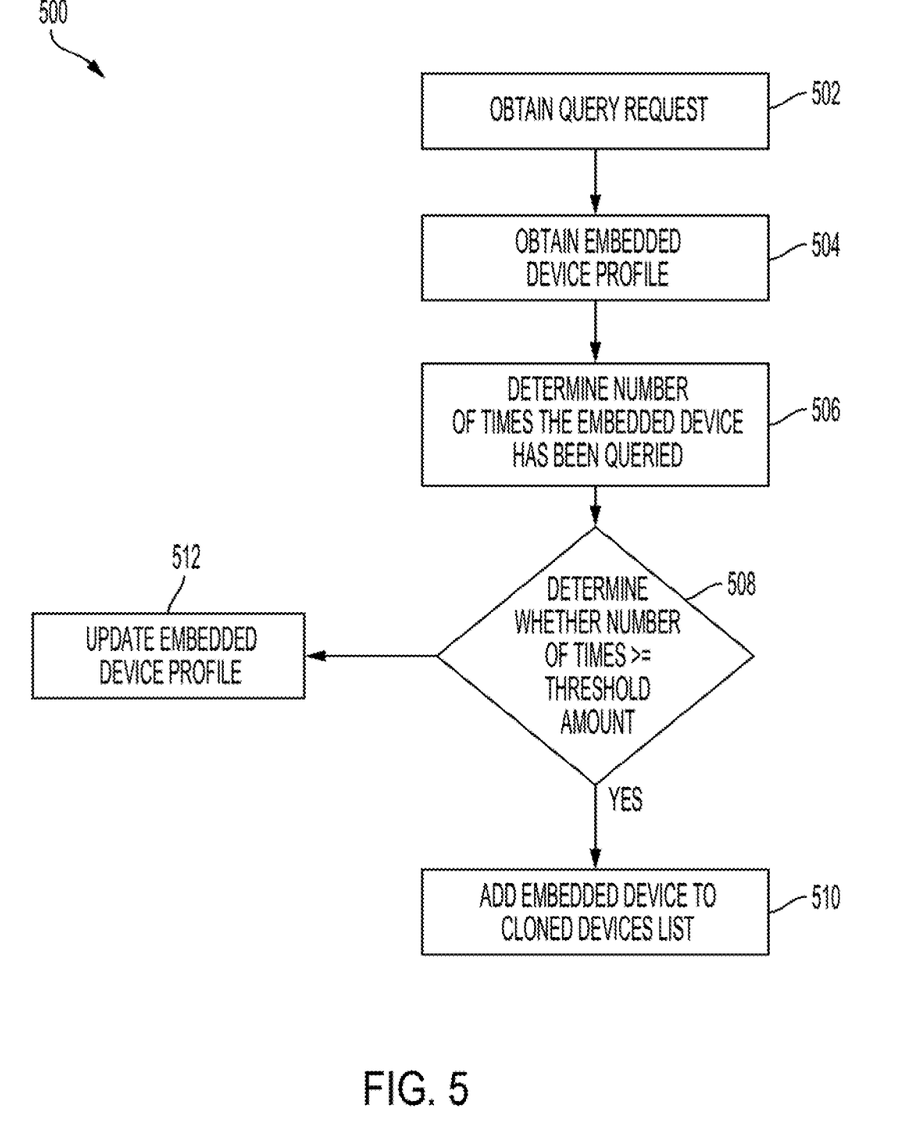
FIG. 5 is a flow diagram of an example process for determining whether an embedded device should be added to the cloned devices list using the anti-cloning system of FIGS. 1A and 1B according to an aspect of the invention.

FIG. 5 is a flow diagram of an example process 500 for determining whether an embedded device 106 should be added to the cloned devices list. One or more computers or one or more data processing apparatuses, for example, the one or more processors 112a-c of the anti-cloning system 100 of FIGS. 1A and 1B, such as the processor 112c of the server 108, appropriately programmed, may implement the process 500. In some implementations, the control device may implement the process 500 and maintain the cloned devices list or a subset of the cloned devices list locally rather than interacting with the server 108 to manage and verifying embedded devices on the cloned devices list.

When the anti-cloning system 100 determines that the embedded device is in proximity to the electronic device 104, the server 108 may obtain a query request from the control device that indicates that the electronic device 104 desires to use the embedded device 106 (502). The query request may include the unique identity value of the embedded device 106. The query request may be received prior to the digital signature of the unique identity value of the embedded device 106 being checked so that the anti-cloning system 100 may maintain and update a cloned devices list that tracks all embedded devices that attempt to interact with the control device and establish a connection with the electronic device 104.

Once the query request is received, the anti-cloning system 100 obtains the embedded device profile that corresponds with the embedded device 106 associated with the unique identity value, as described above (504). The embedded device profile may include an indicator of the number of times that the embedded device 106 has been queried regardless of whether the digital signature of the unique identity value was valid and/or whether the embedded device 106 was checked against the consumed devices list. The indicator tracks the total number of successful and unsuccessful queries of the embedded device 106 to be used by the electronic device 104.

The anti-cloning system 100 determines the number of times that the embedded device 106 has been queried from the embedded device profile (506). The anti-cloning system 100 may extract the indicator from the embedded device profile that indicates the total number of queries of the embedded device 106. The anti-cloning system 100 determines whether the number of times that the embedded device 106 has been queried is greater than or equal to a threshold amount, which may be user-configured or a default value (508). The anti-cloning system 100 compares the number of times with the threshold amount to determine whether to add the unique identity value of the embedded device 105 to the cloned devices list.

When the number of times that the embedded device has been queried is greater than or equal to the threshold amount, the anti-cloning system 100 adds the unique identity value to the cloned devices list (510). This prevents the electronic device 104 from using the embedded device 106. By adding the unique identity value to the cloned devices list, the anti-cloning system 100 prevents the electronic device 104 from using the embedded device 106 with the unique identity value, and thus, the anti-cloning system 100 prevents illegitimate use or reuse of the embedded device 106. Otherwise, when the number of times that the embedded device 106 has been queried is less than the threshold amount, the anti-cloning system 100 increments the number of times that the embedded device 106 has been queried and updates the embedded device profile (512).

Figure 6:
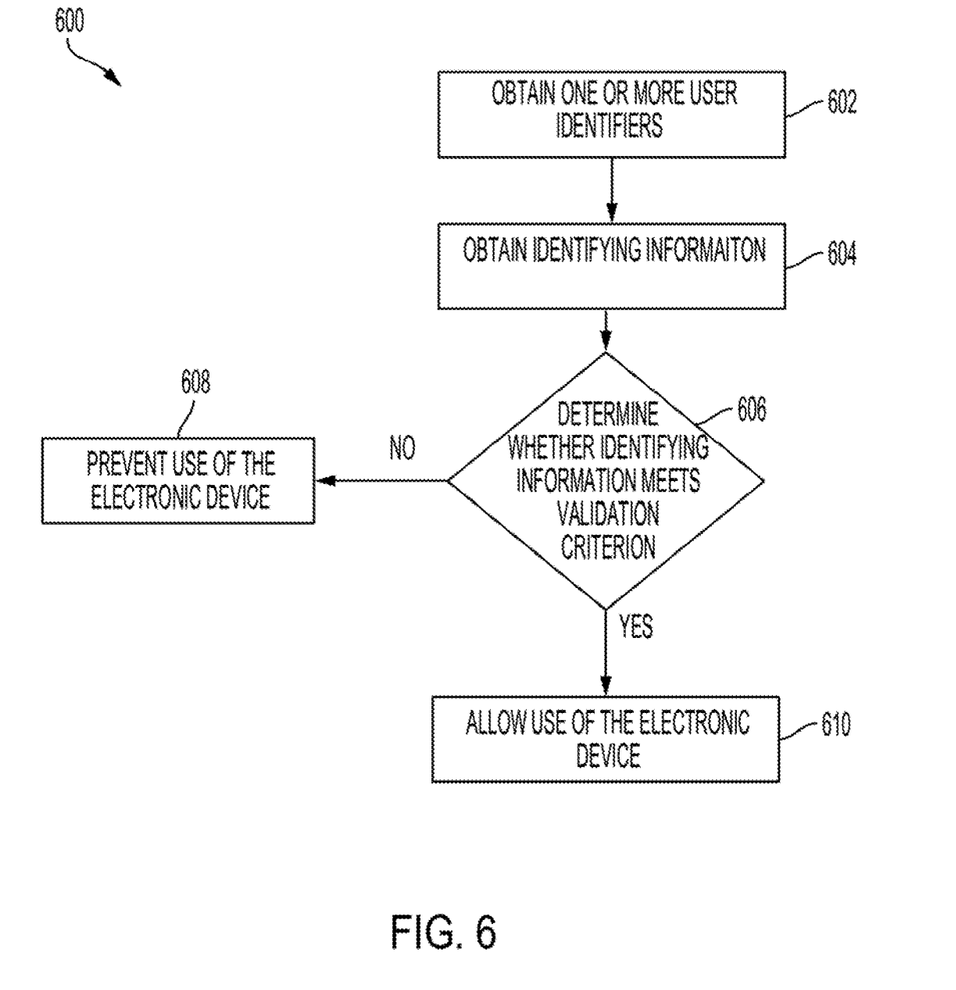
FIG. 6 is a flow diagram of an example process for authorizing the user of the electronic device using the anti-cloning system of FIGS. 1A and 1B according to an aspect of the invention.

FIG. 6 is a flow diagram of an example process 600 for authorizing the user of the electronic device 104. One or more computers or one or more data processing apparatuses, for example, the one or more processors 112a-c of the anti-cloning system 100 of FIGS. 1A and 1B, appropriately programmed, may implement the process 600.

The anti-cloning system 100 may obtain one or more user identifiers of a user of the electronic device (602). The one or more user identifiers of the user may include a photo of the user, a phone number of the user, a physical address of the user, a password of the user, or other identifier, such as a driver's license or credit card information. The control device may use the one or more user interfaces 118a-c to capture the one or more user identifiers, such as a camera on the controller 102 to capture image data that contains the photo of the user and/or the driver's license information.

The anti-cloning system 100 may obtain identifying information from the one or more user identifiers (604). For example, the anti-cloning system 100 may extract the age of the person from the driver's license, the photo of the person from the driver's license or other relevant information. In another example, the age of the person, the address of the person, or other relevant information may also be obtained from the credit card information or the phone number by accessing the credit card account or the account associated with the phone number, respectively.

The anti-cloning system 100 may determine whether the identifying information of the one or more user identifiers of the user meets a validation criterion (606). The validation criterion may be associated with one of the other one or more identifiers of the user and/or a pre-stored criterion. For example, the anti-cloning system 100 may check that the photo on the driver's license matches the photo of the user taken by the camera to ensure that the person in the photo of the user is the same as the photo on the driver's license. The driver's license may be associated with one or more users who are allowed use of the electronic device 104, and so, if the photo of the user matches the driver's license photo, then that person may use the electronic device. In another example, an age may be extracted from the driver's license and compared to a threshold value, such as 18 years or 21 years of age, to determine whether the user is legally allowed to use an electronic cigarette or vaporizer. The address may also be extracted from the driver's license or the credit card information to determine the applicable threshold value depending on the address on the driver's license or the credit card information.

The anti-cloning system 100 may prevent use of the electronic device 104 when the identifying information does not meet the validation criterion (608). For example, when the photo of the user does not match the photo on the driver's licenses of the one or more users allowed to use the electronic device, the anti-cloning system 100 may prevent use of the electronic device 104. Similarly, when the age of the user on the driver's license is less than the legal age to use an electronic device, such as a vaporizer or electronic cigarette, the anti-cloning system 100 may prevent use of the electronic device 104.

The anti-cloning system 100 may allow use of the electronic device 104 when the identifying information does meet the validation criterion (610). For example, when the photo of the user does match the photo on the driver's licenses of the one or more users allowed to use the electronic device, the anti-cloning system 100 may allow use of the electronic device 104. Similarly, when the age of the user on the driver's license is greater than or equal to the legal age to use an electronic device, such as a vaporizer or electronic cigarette, the anti-cloning system 100 may allow use of the electronic device 104. During use of the electronic device 104, the anti-cloning system 100 may require reauthorization of the user after a period of time, such as approximately a week, by prompting the user for the one or more user identifiers after the period of time.

Where used throughout the specification and the claims, "at least one of A or B" includes "A" only, "B" only, or "A and B." Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. An anti-cloning system, comprising:
    a first device configured for a connection to a first embedded device having a first unique identity value; and
    a controller coupled to the first device, the controller having:
        a controller memory configured to store a public verification key, and
        a controller processor coupled to the controller memory and configured to:
            verify the first unique identity value using the public verification key,
            add the first unique identity value to an operating list of embedded device unique identity values based on a number of unique identity values included in the operating list being less than a threshold number, the operating list being associated with one or more respective embedded devices that are temporarily allowed to be used with the first device for a threshold amount of time when the first device is unable to connect with a server to verify the first unique identity value, and
            enable the first device to use the first embedded device based on:
                the first unique identity value being verified, and
                the first unique identity value being added to the operating list.

2. The anti-cloning system of claim 1, wherein the controller is included within the first device; and
    wherein the first unique identity value is:
        a media access control (MAC) address of the first embedded device,
        a Bluetooth Low Energy (BLE) address of the first embedded device, or
        a serial number of the first embedded device.

3. The anti-cloning system of claim 1, wherein the controller is a second device that is remote from the first device.

4. The anti-cloning system of claim 1, wherein the controller processor is further configured to:
    determine whether the first unique identity value is included in a consumed devices list that includes a plurality of unique identity values of embedded devices that have been used; and prevent the use of the first embedded device with the first device based on the first unique identity value being included in the consumed devices list.

5. The anti-cloning system of claim 4, further comprising: the server configured to:
store the consumed devices list, and
check the first unique identity value against the consumed devices list; and
wherein to determine whether the first unique identity value is included in the consumed devices list the controller processor is configured to:
provide the first unique identity value to the server for the checking of the first unique identity value against the consumed devices list, and
obtain an indication related to a result of the checking of the first unique identity value.

6. The anti-cloning system of claim 5, wherein the server includes:
a server memory that is configured to store:
a secret signing key, and
the public verification key; and
a server processor coupled to the server memory and configured to:
digitally sign the first unique identity value using the secret signing key.

7. The anti-cloning system of claim 1, wherein the operating list includes one or more embedded device unique identity values associated with respective one or more embedded devices that are to be used without being compared to a consumed devices list which:
is stored on the server, and
includes a plurality of unique identity values of embedded devices that have been used with the first device.

8. The anti-cloning system of claim 7, wherein the controller processor is further configured to:
generate an alert when any one of the embedded device unique identity values included in the operating list matches a unique identity value included in the consumed devices list; and
prevent use of any embedded device associated with the any one embedded device unique identity value included in the operating list that matches the unique identity value included in the consumed devices list.

9. The anti-cloning system of claim 7, wherein the controller processor is further configured to:
determine that there is no connection between the controller and the server;
determine a duration of time since the operating list was last checked against the consumed devices list;
prevent the use of the first embedded device with the first device based on the duration of time being at least a threshold duration of time; and
allow the use of the first embedded device with the first device based on the duration of time being less than the threshold duration of time.

10. The anti-cloning system of claim 5, wherein the server is further configured to:
obtain the first unique identity value;
compare the first unique identity value against the consumed devices list;
when the first unique identity value is included in the consumed devices list:
send an indication to the controller that the first embedded device is fraudulent; and
when the first unique identity value is not included in the consumed devices list:
send an indication to the controller that the first embedded device is verified, and
add the first unique identity value to the consumed devices list.

11. The anti-cloning system of claim 1, further comprising:
a second device configured for a connection to a second embedded device having a second unique identity value; and
wherein the controller processor is further configured to verify the second unique identity value using the public verification key.

12. The anti-cloning system of claim 1, wherein the first device is further configured for a connection to a second embedded device having a second unique identity value; and
wherein the controller processor is further configured to verify the second unique identity value using the public verification key.

13. An anti-cloning system, comprising:
a server configured to verify one or more unique identity values;
a device configured for a connection to an embedded device having a unique identity value; and
a controller coupled to the device, the controller having:
a controller memory configured to store a public verification key, and
a controller processor coupled to the controller memory and configured to:
verify the unique identity value using the public verification key,
add the unique identity value to an operating list of embedded device identity values based on a number of unique identity values included in the operating list being less than a threshold number, the operating list being associated with one or more respective embedded devices that are temporarily allowed to be used with the device for a threshold amount of time when the device is unable to connect with the server to verify the one or more unique identity values, and
enable the device to use the embedded device based on:
the unique identity value being verified, and
the unique identity value being added to the operating list.

14. The anti-cloning system of claim 13, wherein the controller processor is further configured to:
determine whether the unique identity value is included in a consumed devices list that includes a plurality of unique identity values of embedded devices that have been used with the device; and
prevent the use of the embedded device with the device based on the unique identity value being included in the consumed devices list.

15. The anti-cloning system of claim 14, wherein the server is further configured to:
store the consumed devices list, and
check the unique identity value against the consumed devices list; and
wherein to determine whether the unique identity value is included in the consumed devices list the controller processor is configured to:
provide the unique identity value to the server for the checking of the unique identity value against the consumed devices list, and
obtain an indication related to a result of the checking of the unique identity value.

16. The anti-cloning system of claim 13, wherein the server is further configured to digitally sign the unique identity value using a secret signing key.

17. The anti-cloning system of claim 13, wherein the controller is coupled to a scanner to read the unique identity value; and
wherein the controller is configured to use the scanner to read the unique identity value.

18. The anti-cloning system of claim 17, wherein:
the embedded device is a non-electrical device, and
the unique identity value is a serial number or a bar code to be verified against an algorithm, a black list, or the operating list.

19. A method of verifying an embedded device, comprising:
determining, by a processor on or within a controller, that the embedded device has been connected to a device, the embedded device having a unique identity value;
verifying, by the processor, a digital signature on the unique identity value of the embedded device;
adding, by the processor, the unique identity value to an operating list of unique identity values in response to a number of unique identity values included in the operating list being less than a threshold number, the operating list being associated with one or more respective embedded devices that are temporarily allowed to be used with the device for a threshold amount of time when the first device is unable to connect with a server to verify the unique identity value;
determining, by the processor, whether the unique identity value of the embedded device is included in a consumed devices list stored on the server based on a connection status between the controller and the server; and
enabling, by the processor, the device to use the embedded device in response to:
the digital signature on the unique identity value being verified,
the unique identity value being added to the operating list, and
the unique identity value not being included in the consumed devices list.

20. The method of claim 19, wherein determining whether the unique identity value of the embedded device is included in the consumed devices list includes comparing the unique identity value against a plurality of unique identity values included in the consumed devices list in response to the controller being connected to the server.

* * * * *